(12) United States Patent
Clougherty et al.

(10) Patent No.: US 6,813,269 B1
(45) Date of Patent: Nov. 2, 2004

(54) EXTENDED MESSAGING SCHEME FOR POINT-TO-POINT COMMUNICATIONS

(75) Inventors: Mark M. Clougherty, Chatham, NJ (US); Yik-Ming Ho, Edison, NJ (US); Stuart Warmink, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/507,839

(22) Filed: Feb. 22, 2000

(51) Int. Cl.[7] .............................................. H04L 12/28
(52) U.S. Cl. ...................... 370/392; 370/401; 370/466
(58) Field of Search ............................... 370/389, 391, 370/392, 394, 400, 401, 464, 466, 467, 469, 474; 709/236, 250

(56) References Cited

U.S. PATENT DOCUMENTS

| | | | |
|---|---|---|---|
| 5,333,135 A | * 7/1994 | Wendorf | 370/394 |
| 6,160,808 A | * 12/2000 | Maurya | 370/389 |
| 6,304,574 B1 | * 10/2001 | Schoo et al. | 370/401 |
| 6,389,016 B1 | * 5/2002 | Sabaa et al. | 370/389 |
| 6,430,183 B1 | * 8/2002 | Satran et al. | 370/389 |
| 6,445,787 B1 | * 9/2002 | Vaidya et al. | 379/243 |
| 6,580,785 B2 | * 6/2003 | Bremer et al. | 379/88.13 |

* cited by examiner

*Primary Examiner*—Chau Nguyen
*Assistant Examiner*—Soon-Dong Hyun

(57) ABSTRACT

The extended messaging scheme adds additional packet formats to the prior art 6-byte Lucent Access Interface Unit (AIU) Message Format of Table 1. The extended messaging scheme supports multi-packet messaging over telecommunication system configurations not supported by the prior art AIU Message Format. In one implementation, the extended messaging scheme includes (1) a "first-of-many" packet format for the initial data packets of messages requiring more than one 6-byte data packet, (2) a "continuation" packet format for the one or more subsequent data packets corresponding to such multi-packet messages, and (3) a "first-and-only" packet format for messages requiring only a single data packet. The extended messaging scheme enables telecommunication systems to be configured with one or more (possibly non-co-located) client terminals in addition to a main remote terminal to provide telecommunication services to a large number of widely distributed customers.

30 Claims, 2 Drawing Sheets

EXTENDED MESSAGING SCHEME FOR POINT-TO-POINT COMMUNICATIONS

BACKGROUND OF THE INVENTION

1. Field of the Invention

The present invention relates to signal processing, and, in particular, to packet formats used to transmit messages between different components in a telecommunication system.

2. Description of the Related Art

FIG. 1 shows a block diagram of a portion of a prior art telecommunication system 100. In particular, FIG. 1 shows a central office (CO) 102 of system 100 configured to a remote terminal 104 via a high-bandwidth (e.g., T1) link 106. Remote terminal 104, which conforms to the AnyMedia Access System™ (AMAS) specification of Lucent Technologies of Murray Hill, N.J., comprises a controller 108 and a plurality of peripheral packs 110. Each peripheral pack 110 supports telecommunication services for a number of (e.g., up to 32) different of end users (e.g., ordinary telephones (not shown) connected to remote terminal 104 via conventional TIP/RING phone lines 112). Controller 108 provides the communication interface with CO 102 for remote terminal 104 and controls the operations of the different peripheral packs 110. In particular, controller 108 receives status information from the individual peripheral packs 110 (e.g., information regarding the state of the individual supported phone lines and/or information regarding the peripheral pack itself) via internal point-to-point communication links 114 within remote terminal 104. In addition, based on instructions received from CO 102 and/or based on its own internal processing of the peripheral pack status information, controller 108 generates and transmits commands for configuring individual peripheral packs 110 via the corresponding point-to-point links 114.

Table 1 defines the 6-byte Access Interface Unit (AIU) Message Format used for point-to-point communications between the controller and the individual peripheral packs within a remote terminal that conforms to the Lucent AMAS specification, such as remote terminal 104 of FIG. 1. The AIU Message Format in Table 1 supports message packets from 3 to 6 bytes long. Bits B0–B1 of Byte #0 define the length of the message format by indicating the number of data bytes present, where binary value (B1 B0)=(00) indicates a 3-byte packet with one data byte, (01) indicates a 4-byte packet with two data bytes, (10) indicates a 5-byte packet with three data bytes, and (11) indicates a 6-byte packet with four data bytes. Bytes #0–2 are present in every packet, with the presence of Data Bytes 3–5 being dependent on the length of the packet. Bits B2–B7 of Byte #0 are used for parity bits that ensure the security of packet transmission, where each parity bit corresponds to the even parity value of a different one of the bytes in a packet. Bits B2–B7 of Byte #1 define the job type (e.g., on-hook, off-hook), which determines the meaning of, and actions to be taken upon receipt of the data. Bytes #2–5 are data bytes containing data for the specified job type. Bits B0–B1 of Byte #1 are undefined.

TABLE 1

PRIOR ART AIU MESSAGE FORMAT

| BYTE # | B7 | B6 | B5 | B4 | B3 | B2 | B1 | B0 |
|---|---|---|---|---|---|---|---|---|
| 0 | | | Parity Bits | | | | Length | |
| 1 | | | Job Type | | | | x | x |
| 2 | | | Data[0] | | | | | |
| 3 | | | Data[1] (Length >= 1) | | | | | |
| 4 | | | Data[2] (Length >= 2) | | | | | |
| 5 | | | Data[3] (Length = 3) | | | | | |

As described, the AIU Message Format of Table 1 was designed to support point-to-point communications between the controller of a remote terminal that conforms to the Lucent AMAS specification, such as controller 108 of FIG. 1, and the individual co-located peripheral packs, such as peripheral packs 110. It would be desirable, however, to provide communication systems with configurations other than that shown in FIG. 1. Unfortunately, the AIU Message Format of Table 1 is limited in the types of system configurations that it can support.

SUMMARY OF THE INVENTION

The present invention is directed to an extended messaging scheme based on the 6-byte AIU Message Format of Table 1 that supports multi-packet messaging over a variety of telecommunication system configurations. In one embodiment, the extended messaging scheme provides three additional 6-byte packet formats, corresponding to (1) initial packets (called "first-of-many" packets) for messages requiring more than one 6-byte data packet, (2) subsequent packets (called "continuation" packets) for those multi-packet messages, and (3) sole packets (called "first-and-only" packets) for messages requiring only a single data packet.

In one embodiment, the present invention is a component for a telecommunication system, comprising (a) an input/output (I/O) port configured to receive and transmit data packets over a point-to-point communication link of the telecommunication system; and (b) a processor configured to the I/O port to process data packets received over the communication link and to generate data packets for transmission over the communication link. The processor supports data packets conforming to the AIU Message Format of Table 1 as well as one or more additional packet formats comprising (1) a first-packet format corresponding to an initial packet of a single message, wherein the single message is transmitted over the point-to-point communication link as one or more data packets; and (2) a continuation-packet format corresponding to an other-than-initial packet of the single message for single messages transmitted over the point-to-point communication link as two or more data packets.

In another embodiment, the present invention is a telecommunication system, comprising (a) a remote terminal and (b) at least one client terminal. The remote terminal comprises (1) a remote terminal controller; and (2) one or more packs, each configured to communicate with the remote terminal controller via a point-to-point communication link, wherein the one or more packs comprise zero, one, or more peripheral packs and one or more server packs. Each client terminal comprises (1) a client terminal controller configured to communicate with a corresponding server pack of the remote terminal; and (2) one or more client packs, each configured to communicate with the client terminal controller via a point-to-point communication link, wherein the one or more client packs comprise zero, one, or more peripheral packs and zero, one, or more server packs. The remote terminal controller, the at least one client terminal controller, and the one or more server packs support data packets conforming to the AIU Message Format of Table 1 as well as one or more additional packet formats comprising (1) a first-packet format corresponding to an initial packet of a single message, wherein the single message is transmitted over the point-to-point communication link as one or more data packets; and (2) a continuation-packet format corresponding to an other-than-initial packet of the single message for single messages transmitted over the point-to-point communication link as two or more data packets.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
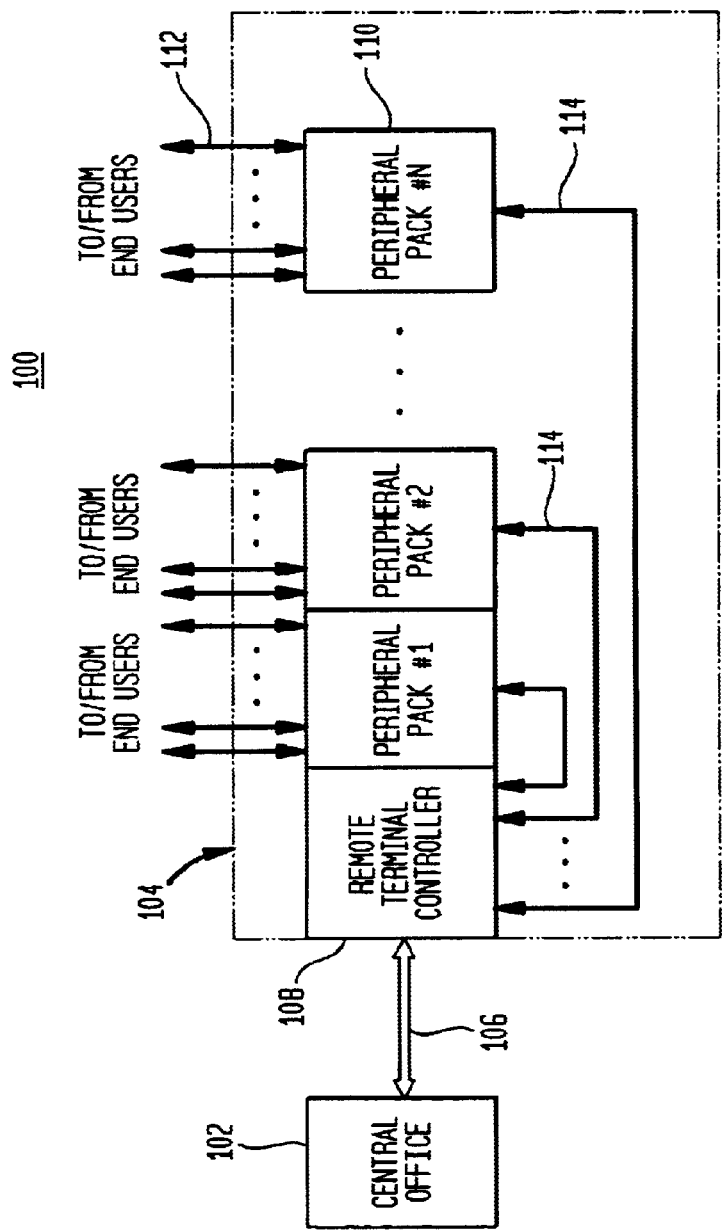
FIG. 1 shows a block diagram of a portion of a prior art telecommunication system.
Figure 2:
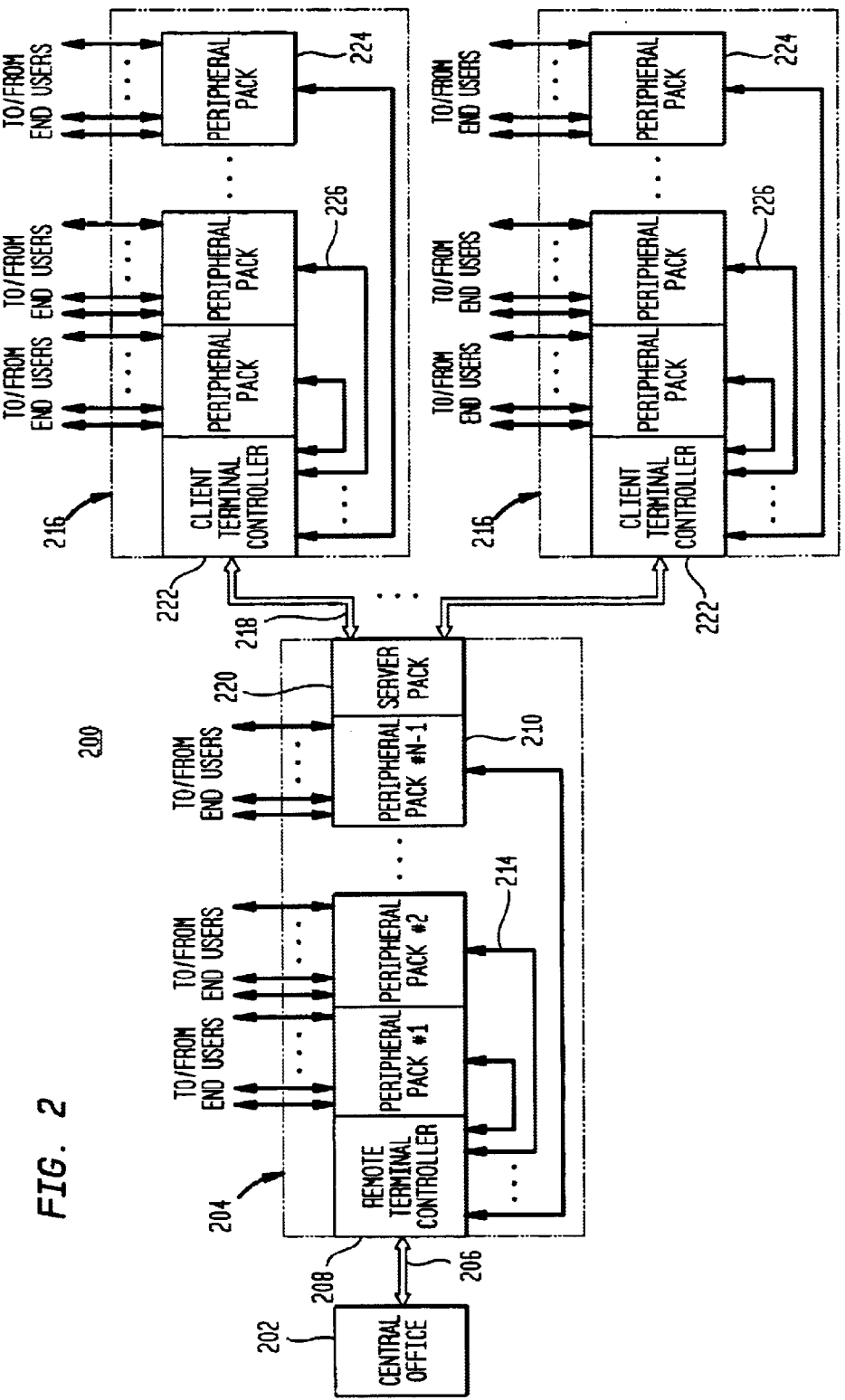
FIG. 2 shows a block diagram of a portion of a telecommunication system, according to one embodiment of the present invention.

FIG. 2 shows a block diagram of a portion of a telecommunication system 200, according to one embodiment of the present invention. In particular, FIG. 2 shows a central office (CO) 202 of system 200 configured to a remote terminal 204 via a high-bandwidth (e.g., T1) link 206, where remote terminal 204 is in turn configured to one or more client terminals 216 via second high-bandwidth (e.g., T1) links 218. CO 202 and remote terminal 204 of system 200 are analogous to CO 102 and remote terminal 104 of prior art system 100 of FIG. 1, except that remote terminal 204 has a server pack 220 in place of peripheral pack #N. As opposed to a peripheral pack which provides direct telecommunication service for a number of (e.g., up to 32) end users, such as peripheral packs 110 in FIG. 1 or peripheral packs 210 of FIG. 2, server pack 220 provides indirect telecommunication service for a potentially larger number of end users by interfacing with controller 222 of each client terminal 216.

Each client terminal controller 222 operates analogously to remote terminal controller 208 to provide the communication interface with remote terminal 204 for a particular client terminal 216 and control the operations of the corresponding client terminal peripheral packs 224. In particular, each client terminal controller 222 receives status information from its individual co-located client terminal peripheral packs 224 via internal point-to-point communication links 226 within client terminal 216. In addition, based on instructions received from remote terminal 204 and/or based on its own internal processing of the client terminal peripheral pack status information, client terminal controller 222 generates and transmits commands for configuring its individual client terminal peripheral packs 224 via corresponding point-to-point links 226.

The AIU Message Format defined in Table 1 cannot be used efficiently to support the indirect exchange of information via server pack 220 between remote terminal controller 208 and the various components within each client terminal 216 (i.e., neither client terminal controller 222 itself nor the corresponding individual client terminal peripheral packs 224), for the following three reasons:

(1) The AIU Message Format of Table 1 provides a maximum of only four data bytes per message. Under the AIU Message Format of Table 1, every message must fit within a single 6-byte packet.

(2) The AIU Message Format does not provide room for any routing information, for example, when the message may need to be forwarded from one component (e.g., remote terminal controller 208) to one of multiple destinations beyond that component (e.g., a particular client terminal peripheral pack 224).

(3) The AIU Message Format does not provide a mechanism to include lower-level message link information, such as flow control.

According to the present invention, the AIU Message Format defined in Table 1 has been extended to support communications in telecommunication systems such as system 200 that have configurations that differ from the basic configuration shown in FIG. 1 for system 100. In particular, the 6-byte AIU Message Format has been extended to support messages having anywhere from 1 to 255 bytes of application data, where messages having more than 4 bytes of application data are segmented into two or more message packets, while each message packet still has a maximum size of 6 bytes. The extended AIU Message Format defines three additional types of message packets: (1) a "first-of-multiple" packet as defined by the format specified in Table 2, (2) a "continuation" packet as defined by the format specified in Table 3, and (3) a "first-and-only" packet as defined by the format specified in Table 4. The values of Bits B6–B7 of Byte #1 identify to which of the formats of Tables 2–4 each particular packet conforms, as shown in Table 5.

TABLE 2

"FIRST-OF-MULTIPLE" PACKET FORMAT

| BYTE # | B7 | B6 | B5 | B4 | B3 | B2 | B1 | B0 |
|---|---|---|---|---|---|---|---|---|
| 0 | | | Parity Bits | | | | Length | |
| 1 | 1 | 1 | Control | | Element ID | | Application Group | |
| 2 | x | x | Sequence Length | | | | | |
| 3 | Data[0] | | | | | | | |
| 4 | Data[1] (Length >= 1) | | | | | | | |
| 5 | Data[2] (Length >= 2) | | | | | | | |

TABLE 3

"CONTINUATION" PACKET FORMAT

| BYTE # | B7 | B6 | B5 | B4 | B3 | B2 | B1 | B0 |
|---|---|---|---|---|---|---|---|---|
| 0 | | | Parity Bits | | | | Length | |
| 1 | 0 | 1 | Sequence Number | | | | | |
| 2 | Data[0] | | | | | | | |
| 3 | Data[1] (Length >= 1) | | | | | | | |
| 4 | Data[2] (Length >= 2) | | | | | | | |
| 5 | Data[3] (Length = 3) | | | | | | | |

TABLE 4

"FIRST-AND-ONLY" PACKET FORMAT

| BYTE # | B7 | B6 | B5 | B4 | B3 | B2 | B1 | B0 |
|---|---|---|---|---|---|---|---|---|
| 0 | | | Parity Bits | | | | Length | |
| 1 | 1 | 0 | Control | | Element ID | | Application Group | |
| 2 | Data[0] | | | | | | | |
| 3 | Data[1] (Length >= 1) | | | | | | | |
| 4 | Data[2] (Length >= 2) | | | | | | | |
| 5 | Data[3] (Length = 3) | | | | | | | |

TABLE 5

PACKET TYPES

| Byte #1, Bit B6 | Byte #2, Bit B7 | Packet Type |
| --- | --- | --- |
| 0 | 0 | Prior Art AIU Core Job Packet of Table 1 |
| 1 | 1 | "First-of-Multiple" Packet of Table 2 |
| 1 | 0 | "Continuation" Packet of Table 3 |
| 0 | 1 | "First-and-Only" Packet of Table 4 |

The messaging scheme of the present invention addresses all three limitations listed earlier for the AIU Message Format of Table 1, while, at the same time, remains backwards compatible with the existing AIU Message Format. This backwards compatibility is an important advantage of the present invention, because of the existence of Lucent AMAS hardware and software associated with the prior art AIU Message Format of Table 1.

The Job Type and Data[0–3] fields in the AIU Message Format of Table 1 are referred to as "application data," since that part of each AIU packet corresponds to data that is useful to the originator and terminator of the AIU message, as opposed to the rest of the packet information (i.e., Length and Parity Bit fields), which used to coordinate packet transmission. The messaging scheme of the present invention allows the application data to be of any size from 1 to 255 bytes by segmenting the data across multiple 6-byte packets. The enhancements of the prior art AIU Message Format of Table 1 are referred to herein as the "Extended Packet Formats," since particular application data may take one or more 6-byte packets to be sent over a particular point-to-point link (e.g., either a link 214 within remote terminal 204 or a link 226 within a client terminal 216 of FIG. 2).

The present invention provides multi-packet integrity through the use of a sequence number so that the terminating end can determine that both the correct sequence and the correct number of packets that make up the multi-packet message have arrived. In order to remain backwards compatible with the AIU Message Format of Table 1, the first byte (i.e., Byte #0) in each packet of each Extended Packet Format of Tables 2–4 is identical to Byte #0 in the AIU Message Format of Table 1, with bits B0–B1 identifying the length of the packet and bits B2–B7 containing parity bits corresponding to the packet bytes.

In the prior art AIU Message Format of Table 1, the Job Type bits in Byte # 1 are grouped into two categories: "core jobs" and "application specific jobs." Core jobs are jobs that every component in the remote terminal has to handle, while application specific jobs are jobs that would be different for different types of components, but still within the remote terminal. Thus, any remote terminal pack (e.g., either a peripheral pack or a server pack) that communicates with the remote terminal controller must support at least the core job types. When peripheral packs that are designed to operate in a remote terminal are configured as peripheral packs in client terminals, the client terminal controller will also need to support the set of core jobs. Otherwise, the client terminal components (i.e., the client terminal controller, any client terminal peripheral packs, and any client terminal server packs) need only support the extended messaging format of Tables 2–4.

All of the core job types for the prior art AIU Message Format of Table 1 happen to have the two most signification bits (MSBs) in the Job Type field (i.e., bits B6–B7 of Byte #1 in Table 1) both set to 0. As such, there are three remaining binary codes (01, 10, and 11) that can be used to indicate that a non-core packet conforms to an Extended Packet Format of the present invention. This implies that the Extended Packet Formats of the present invention no longer have a Job Type associated with the application data. Instead, the first byte of application data in a message (i.e., Byte #3 in Table 2 or Byte #2 in Table 4) may be used as a message ID to specify what kind of message it is. With such a small packet size (i.e., 6 bytes maximum), it is important to make efficient use of the five bytes that are left in each packet (i.e., after Byte #0). The present invention achieves this by using bits B6–B7 of Byte #1 to indicate whether the packet is:

(1) A "first-of-multiple" packet: The first packet for a message requiring multiple packets;

(2) A "continuation" packet: A packet after the first packet for a message requiring multiple packets; or (3) A "first-and-only" packet: A packet for messages requiring only a single packet.

For a "first-of-multiple" packet, a Sequence Length field (i.e., bits B0–B5 of Byte #2) indicates how may continuation packets will follow the first-of-multiple packet for the same message. The maximum binary Sequence Length value of (111111) (i.e., 63) indicates that there are 63 continuation packets following the first-of-multiple packet. With 3 bytes of application data in the "first-of multiple" packet and 4 bytes of application data in each "continuation" packet, this corresponds to a total of 255 bytes of application data as the maximum message size supported by the present invention.

For a "continuation" packet, a Sequence Number field (i.e., bits B0–B5 of Byte #1) indicates the sequence number of the current continuation packet.

Since a "first-and-only" packet has no continuation packets associated with it, the packet format does not need to identify either a Sequence Length or a Sequence Number field, thus allowing for more efficient use of the packet (i.e., up to four application data bytes).

In an alternative implementation, since a Sequence Length value of 0 does not have to be used, the values stored in the Sequence Length and Sequence Number fields can be used to indicate the values 1 to 64, instead of 0 to 63. In that case, the extended messaging format of the present invention can be used to support messages having up to 259 bytes of application data.

In addition, the messaging scheme of the present invention uses bits (B0–B5) in Byte #1 in the Extended Packet Formats of Tables 2 and 4 to provide additional, new functionality beyond that available in the prior art AIU Message Format of Table 1, as follows:

A Control bit (i.e., bit B5 of Byte #1 in Tables 2 and 4) indicates whether the packet is a regular multi-packet message packet or is a special link control packet. If set to indicate the latter, then the remaining contents of the packet can be used to signal link error conditions, or apply flow control, or other such useful features.

An Element ID field (i.e., bits B3–B4 of Byte #1 in Tables 2 and 4). In applications where the receiving pack is not the final destination of the message (but has to terminate the Extended Packet Format protocol on the corresponding point-to-point link anyway), the Element ID field indicates routing information (e.g., which of up to four other components the message is destined for). For instance, the Element ID field enables a server pack, such as server pack 220 in FIG. 2, to be configured to up to four client terminals, such as client terminals 216 in FIG. 2, thereby alleviating the requirement of each client terminal being in direct communication with remote terminal controller 208.

Referring again to FIG. 2, Element ID field supports messaging between remote terminal controller 208 and the various client terminal controllers 222. In the remote terminal-to-client terminal direction (i.e., the downstream direction), server pack 220 utilizes the Element ID field to determine which port to route the message. In the opposite (i.e., upstream) direction, remote terminal controller 208 uses the Element ID field to determine which client terminal 216 was the originator of the message.

An additional level of routing is provided by the Application Group field (i.e., bits B0–B2 of Byte #1 in Tables 2 and 4), which provides the ability to route messages to specific applications within a pack. In particular, the 3-bit Application Group field can be used to route messages to a particular one of up to eight different software applications implemented within a controller. Possible different software applications implemented on a client terminal controller include, but are not limited to, (1) line card applications that manage the customer lines supported by the client terminal, (2) testing applications that perform testing of the client terminal itself, and (3) terminal control applications that provide high-level management of the client terminal itself.

In the downstream direction, the remote terminal controller can use the Application Group field to route messages to an appropriate software application in a particular client terminal (identified by the Element ID field). Alternatively, the Application Group field can be used to identify the software application in the remote terminal that is the originator of the message. Similarly, in the upstream direction, the client terminal can use the Application Group field either to identify which client terminal application was the originator or which remote terminal application is to be the recipient of the message. In any case, the Application Group field essentially provides for a "logical connection" between software entities implemented on the remote terminal controller and a client terminal controller (or other peripheral component).

Prior art messaging schemes for transferring flexible-length data messages typically uses framed data, where certain pre-defined data patterns are used to indicate the start and end of a message. HDLC (High-level Data Link Control) would be such a protocol. Using framed data is not efficient in certain situations where complex bit-stuffing and bit-removal algorithms to avoid emulation of start and stop patterns is undesirable. Other higher layer protocols (such as LAPD (Link Access Procedure D) and TCP/IP (Transmission Control Protocol)) are constrained by a packet size, but not only does the messaging scheme of the present invention provide a much larger limit (in the order of hundreds of bytes), but it is left up to the application and other higher layers to segment longer application messages into these packets.

In order to provide the same control and routing features, other prior art messaging schemes typically use a layered protocol approach (e.g., the OSI (Open Systems Interconnection) stack). However, such a layered approach would have the disadvantage of not being able to pack all the message data (i.e., control, routing, sequencing, and application data) into the smallest size possible. With only 6-byte packets to work with, it is important to use them as efficiently as possible in order to reduce the total number of packets sent for any given application message.

In general, the originator of the message may be referred to as the source component and the ultimate recipient of the message may be referred to as the destination component. For those messages that are transmitted in the downstream direction, depending on the particular message and the particular system configuration, the source component may be either a (remote or client) controller or a server pack, and the destination component may be a server pack, a (client) controller, or a peripheral pack. In the upstream direction, again depending on the particular message and the particular system configuration, the source component may be a peripheral pack, a (client) controller, or a server pack, and the destination component may be a (client or remote) controller or a server pack.

The prior art AIU Message Format of Table 1 is designed for communications in which the source and destination components are connected by a single point-to-point communication link. The extended messaging scheme of the present invention extends the prior art to support communications in which the source and destination components are connected by two or more point-to-point communication links through one or more intermediate components which comprise, depending on the particular message and the particular system configuration, one or more server packs and zero, one, or more client controllers. In general, each source component, intermediate component, and destination component may be said to comprise (a) an input/output (I/O) port configured to receive and transmit data packets over a point-to-point communication link of the telecommunication system and (b) a processor configured to the I/O port to process data packets received over the communication link and to generate data packets for transmission over the communication link.

Although the present invention has been described in the context of an extended messaging scheme in which the three packet formats of Tables 2–4 are added to the prior art AIU Message Format of Table 1, those exact three extended packet formats are not the only possible way of defining "first-of-many," "continuation," and "first-and-only" packets. For example, the exact locations and/or sizes of different fields (e.g., Control, Element ID, Application Group, and Sequence Length) in the different packet formats can be modified while still providing the same or similar types of packets.

In addition, the extended messaging scheme of the present invention could be implemented using only "first-of-many" and "continuation" packets, where a message having no more than three bytes of application data could be transmitted using a single "first-of-many" packet with the Sequence Length field set to 0 indicating that there are no "continuation" packets. At a certain level, the inclusion of the "first-and-only" packet format is a design optimization to enable transmission of messages having four bytes of application data in a single packet.

Although the present invention has been described in the context of the particular configuration of FIG. 2 comprising a single remote terminal with a single server pack and up to four client terminals, the present invention can also be implemented in alternative configurations, including (A) configurations with more than one server pack in the remote terminal, with each server pack supporting one or more client terminals and/or (B) configurations with one or more additional "component levels" supported, for example, by replacing one or more client terminal peripheral packs with one or more client terminal server packs within one or more client terminals to support one or more "sub-client" terminals, and so on for additional component levels. It will also be understood that, depending on system requirements, the one or more client terminals may be located in the same facility as the remote terminal, or located remotely from the remote terminal and/or each other in different facilities.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A component for a telecommunication system, comprising:

(a) an input/output (I/O) port capable of receiving and transmitting data packets over a point-to-point communication link of the telecommunication system; and (b) a processor connected to the I/O port to process data packets received over the communication link and to generate data packets for transmission over the communication link, wherein the processor supports data packets conforming to an AIU Message Format as well as one or more additional packet formats comprising:

(1) a first-packet format corresponding to an initial packet of a single message, wherein the single message is transmitted over the point-to-point communication link as one or more data packets; and (2) a continuation-packet format corresponding to an other-than-initial packet of the single message for single messages transmitted over the point-to-point communication link as two or more data packets, wherein the definition of fields in the first-packet format is different from the definition of fields in the continuation-packet format, wherein:

the first-packet format conforms to a format of Table 2 as follows:

TABLE 2

"FIRST-OF-MULTIPLE" PACKET FORMAT

| BYTE # | B7 | B6 | B5 | B4 | B3 | B2 | B1 | B0 |
|---|---|---|---|---|---|---|---|---|
| 0 | | | Parity Bits | | | | Length | |
| 1 | 1 | 1 | Control | Element ID | | Application Group | | |
| 2 | x | x | Sequence Length | | | | | |
| 3 | | | Data[0] | | | | | |
| 4 | | | Data[1] (Length >= 1) | | | | | |
| 5 | | | Data[2] (Length >= 2) | | | | | | and the continuation-packet format conforms to a format of Table 3 as follows:

TABLE 3

"CONTINUATION" PACKET FORMAT

| BYTE # | B7 | B6 | B5 | B4 | B3 | B2 | B1 | B0 |
|---|---|---|---|---|---|---|---|---|
| 0 | | | Parity Bits | | | | Length | |
| 1 | 0 | 1 | Sequence Number | | | | | |
| 2 | | | Data[0] | | | | | |
| 3 | | | Data[1] (Length >= 1) | | | | | |
| 4 | | | Data[2] (Length >= 2) | | | | | |
| 5 | | | Data[3] (Length = 3). | | | | | |

2. The component of claim 1, wherein each data packet conforming to one of the one or more additional packet formats has a maximum size of 6 bytes.

3. The component of claim 1, wherein:

the first-packet format is a first-of-multiple-packets format corresponding to the initial packet of the single message; and the one or more additional packet formats further comprise a first-and-only-packet format corresponding to a message consisting of only a single packet.

4. The component of claim 3, wherein:

the first-and-only-packet format conforms to a format of Table 4 as follows:

TABLE 4

"FIRST-AND-ONLY" PACKET FORMAT

| BYTE # | B7 | B6 | B5 | B4 | B3 | B2 | B1 | B0 |
|---|---|---|---|---|---|---|---|---|
| 0 | | | Parity Bits | | | | Length | |
| 1 | 1 | 0 | Control | Element ID | | Application Group | | |
| 2 | | | Data[0] | | | | | |
| 3 | | | Data[1] (Length >= 1) | | | | | |
| 4 | | | Data[2] (Length >= 2) | | | | | |
| 5 | | | Data[3] (Length = 3). | | | | | |

5. The component of claim 1, wherein the component is a peripheral pack.

6. The component of claim 1, wherein the component is a server pack.

7. The component of claim 6, wherein the server pack is configured to be connected to two or more different client terminals.

8. The component of claim 1, wherein the component is a controller for a terminal further comprising one or more packs, wherein the one or more packs comprise zero, one, or more peripheral packs and zero, one, or more server packs.

9. The component of claim 1, wherein the one or more additional packet formats support routing information that enables the component to be configured in a telecommunication system that supports transmission of messages over two or more point-to-point communication links from a source component to a destination component via one or more intermediate components.

10. The component of claim 9, wherein the one or more intermediate components comprise at least one server pack.

11. The component of claim 10, wherein:

in a downstream direction, the source component is a controller or a server pack, and the destination component is a controller, a server pack, or a peripheral pack, and in an upstream direction, the source component is a peripheral pack, a server pack, or a controller, and the destination component is a server pack or a controller.

12. The component of claim 10, wherein the one or more intermediate components further comprise at least one client controller.

13. A telecommunication system, comprising:

(a) a remote terminal, comprising:

(1) a remote terminal controller; and (2) one or more packs, each capable of communicating with the remote terminal controller via a point-to-point communication link, wherein the one or more packs comprise zero, one, or more peripheral packs and one or more server packs; and (b) at least one client terminal, each comprising: p2 (1) a client terminal controller capable of communicating with a corresponding server pack of the remote terminal; and (2) one or more client packs, each capable of communicating with the client terminal controller via a point-to-point communication link, wherein the one or more client packs comprise zero, one, or more peripheral packs and zero, one, or more server packs, wherein:

the remote terminal controller, the at least one client terminal controller, and the one or more server packs support data packets conforming to an AIU Message Format as well as one or more additional packet formats comprising:

(1) a first-packet format corresponding to an initial packet of a single message, wherein the single message is transmitted over the point-to-point communication link as one or more data packets; and (2) a continuation-packet format corresponding to an other-than-initial packet of the single message for single messages transmitted over the point-to-point communication link as two or more data packets, wherein the definition of fields in the first-packet format is different from the definition of fields in the continuation-packet format, wherein:

the first-packet format conforms to a format of Table 2 as follows:

TABLE 2

"FIRST-OF-MULTIPLE" PACKET FORMAT

| BYTE # | B7 | B6 | B5 | B4 | B3 | B2 | B1 | B0 |
|---|---|---|---|---|---|---|---|---|
| 0 | Parity Bits | | | | | | Length | |
| 1 | 1 | 1 | Control | Element ID | | Application Group | | |
| 2 | x | x | Sequence Length | | | | | |
| 3 | Data[0] | | | | | | | |
| 4 | Data[1] (Length >= 1) | | | | | | | |
| 5 | Data[2] (Length >= 2) | | | | | | | | and the continuation-packet format conforms to a format of Table 3 as follows:

TABLE 3

"CONTINUATION" PACKET FORMAT

| BYTE # | B7 | B6 | B5 | B4 | B3 | B2 | B1 | B0 |
|---|---|---|---|---|---|---|---|---|
| 0 | Parity Bits | | | | | | Length | |
| 1 | 0 | 1 | Sequence Number | | | | | |
| 2 | Data[0] | | | | | | | |
| 3 | Data[1] (Length >= 1) | | | | | | | |
| 4 | Data[2] (Length >= 2) | | | | | | | |
| 5 | Data[3] (Length = 3). | | | | | | | |

14. The system of claim 13, wherein each data packet conforming to one of the one or more additional packet formats has a maximum size of 6 bytes.

15. The system of claim 13, wherein:

the first-packet format is a first-of-multiple-packets format corresponding to the initial packet of the single message; and the one or more additional packet formats further comprise a first-and-only-packet format corresponding to a message consisting of only a single packet.

16. The system of claim 15, wherein:

the first-and-only-packet format conforms to a format of Table 4 as follows:

TABLE 4

"FIRST-AND-ONLY" PACKET FORMAT

| BYTE # | B7 | B6 | B5 | B4 | B3 | B2 | B1 | B0 |
|---|---|---|---|---|---|---|---|---|
| 0 | Parity Bits | | | | | | Length | |
| 1 | 1 | 0 | Control | Element ID | | Application Group | | |
| 2 | Data[0] | | | | | | | |
| 3 | Data[1] (Length >= 1) | | | | | | | |
| 4 | Data[2] (Length >= 2) | | | | | | | |
| 5 | Data[3] (Length = 3). | | | | | | | |

17. The system of claim 13, wherein at least one server pack is configured to two or more different client terminals.

18. The system of claim 13, wherein the one or more additional packet formats support routing information that enables the telecommunication system to support transmission of messages over two or more point-to-point communication links from a source component to a destination component via one or more intermediate components.

19. The system of claim 18, wherein the one or more intermediate components comprise at least one server pack.

20. The system of claim 19, wherein:

in a downstream direction, the source component is a controller or a server pack, and the destination component is a controller, a server pack, or a peripheral pack, and in an upstream direction, the source component is a peripheral pack, a server pack, or a controller, and the destination component is a server pack or a,controller.

21. The system of claim 19, wherein the one or more intermediate components further comprise at least one client controller.

22. The component of claim 1, wherein:

the first-packet format comprises:
 a format-identification field that identifies the format of the packet;
 a sequence-length field that identifies the number of data packets for the single message; and
 a first number of data fields that contain data from the single message; and the continuation-packet format comprises:
 a format-identification field that identifies the format of the packet;
 a sequence-number field that identifies the sequence number of the packet; and
 a second number of data fields that contain data from the single message.

23. The component of claim 22, wherein the second number is greater than the first number.

24. The component of claim 1, wherein:

the first-packet format comprises one or more fields that identify one or more of an element and an application group for the single message; and the continuation-packet format does not comprise fields that identify either the element or the application group for the single message.

25. The component of claim 3, wherein the definition of fields in the first-and-only-packet format is different from the definition of fields in the continuation-packet format and the definition of fields in the first-of-multiple-packets format.

26. The component of claim 25, wherein:

the first-of-multiple-packets format comprises:
 a format-identification field that identifies the format of the packet;

a sequence-length field that identifies the number of data packets for the single message; and a first number of data fields that contain data from the single message;

the continuation-packet format comprises:

a format-identification field that identifies the format of the packet;

a sequence-number field that identifies the sequence number of the packet; and a second number of data fields that contain data from the single message; and the first-and-only-packet format comprises:

a format-identification field that identifies the format of the packet; and a third number of data fields that contain data from the single message.

27. The component of claim 26, wherein the second and third numbers are equal to each other and greater than the first number.

28. The component of claim 25, wherein:

each of the first-of-multiple-packets format and the first-and-only-packet format comprises one or more fields that identify one or more of an element and an application group for the single message; and the continuation-packet format does not comprise fields that identify either the element or the application group for the single message.

29. The component of claim 1, wherein the AIU Message Format is defined by Table 1 as follows:

30. The system of claim 14, wherein the AIU Message Format is defined by Table 1 as follows:

TABLE 1

| AIU MESSAGE FORMAT | | | | | | | | |
|---|---|---|---|---|---|---|---|---|
| BYTE # | B7 | B6 | B5 | B4 | B3 | B2 | B1 | B0 |
| 0 | Parity Bits | | | | | | Length | |
| 1 | Job Type | | | | | | x | x |
| 2 | Data [0] | | | | | | | |
| 3 | Data[1] (Length >= 1) | | | | | | | |
| 4 | Data[2] (Length >= 2) | | | | | | | |
| 5 | Data [3] (Length = 3) | | | | | | | |

TABLE 1

| AIU MESSAGE FORMAT | | | | | | | | |
|---|---|---|---|---|---|---|---|---|
| BYTE # | B7 | B6 | B5 | B4 | B3 | B2 | B1 | B0 |
| 0 | Parity Bits | | | | | | Length | |
| 1 | Job Type | | | | | | x | x |
| 2 | Data[0] | | | | | | | |
| 3 | Data[1] (Length >= 1) | | | | | | | |
| 4 | Data[2] (Length >= 2) | | | | | | | |
| 5 | Data[3] (Length = 3). | | | | | | | |

* * * * *